United States Patent Office 3,252,805
Patented May 24, 1966

3,252,805
PROCESS FOR PREPARING QUICK-COOKING PASTA
Boleslaw Sienkiewicz, Pearl River, and Richard B. Kohler, Yorktown Heights, N.Y., assignors to General Foods Corporation, White Plains, N.Y., a corporation of Delaware
No Drawing. Filed Mar. 5, 1964, Ser. No. 349,737
4 Claims. (Cl. 99—85)

This application is a continuation-in-part of our application Serial No. 163,062, filed December 29, 1961, and now abandoned.

This invention relates to the manufacture of a quick-cooking pasta product, such as spaghetti, macaroni and the like.

Heretofore, pre-cooked pasta products capable of reconstitution in boiling water in a matter of minutes have been prepared by shaping an uncooked alimentary paste into desired form, gelatinizing the shaped dough mass and then drying it to a stable moisture of less than 10%. Typical of the most recent versions of such processes are U.S. Patent Nos. 2,704,723 and 2,552,120 to Poole and Scotland, respectively. Poole teaches cooking a freshly extruded alimentary dough paste followed by dehydration through the use of forced circulating hot air at a temperature of 250° F. and above. Scotland, on the other hand, teaches a process for the infrared gelatinization of an alimentary dough paste of desired shape, completion of the cooking operation in a steam chamber and infrared drying of the cooked dough shape to a stable moisture content without the use of any significant level of circulating drying air. These processes suffer from a number of disadvantages as do the products produced therefrom.

In attempting to reproduce the teachings of Poole, one must employ a mono-layer of the cooked dough pieces. Otherwise, the overlapping dough pieces in a poly-layer bed will mat together and adhere to one another. This condition will persist to a point where it is impossible to break the clumped mass into individual discrete particles without excessive breakage of the dried paste. Naturally, the drying of a mono-layer of product leaves much to be desired from the standpoint of production. The Poole teachings, therefore, do not represent a commercially practical method for dehydration. Furthermore, the product produced by the Poole process is in a puffed condition which tends to float when added to an excess of boiling water and therefore does not rehydrate effectively.

In the case of the Scotland process, a major factor in providing a quick-cooking product is the provision of an extremely thin-walled macaroni. This type of macaroni is not normally used in households accustomed to using conventional macaroni or spaghetti. Furthermore, the product produced by following the teachings of Scotland is decidedly inferior to regular cooked macaroni or spaghetti in that the product is mealy and mushy and, hence, lacks the desired texture and mouth feel of a good quality pasta product.

It has now been discovered that an alimentary dough paste which is shaped into a desired form of any given dimension or wall thickness can be converted to a pasta product of good appearance and eating quality when drying from a multi-layer bed provided the cooked pasta shape is cooled and washed free of surface starch, partially dehydrated to reduce adhesion between the pasta pieces during subsequent drying and a majority of the product moisture in these pieces is evaporated by circulating hot air at a temperature of 130° to 210° F. through the multi-layered bed.

According to the present invention, any conventional alimentary paste, such as is derived by the preparation of a dough of semolina wheat flour having a moisture content of about 25–35%, is kneaded and formed by extrusion into the desired shape, which shape is then cooked in an excess of boiling water for a period of time sufficient to gelatinize the dough to obtain the desired edible texture called for in rehydrating the finished product. Thereafter, as a feature of the present invention, the cooked dough shape is cooled to 100° F. or below to facilitate handling by such means as pumps or other conveying means and then washed to remove excess free starch from the product. The washed pasta is then allowed to drain and, in accordance with one species of the invention, is surface-dried. Surface-drying may be accomplished by any suitable means, e.g. by spreading the pasta in a monolayer in the presence of a draft of recirculating room temperature air or by arranging the pasta in a multi-layer bed of about 1–2" in height and then allowing the pasta bed to be surface dried in room temperature air to the extent that the surface of each washed dough piece is made tacky. It is this tacky condition which signifies that the cooked and washed dough shape has reached a state of rigidity such that it may be assembled into a second multi-layer bed and subjected to a forced draft of circulating air having a temperature of below 210° F. to carry the product down to a moisture content where it is stable, the dried bed being readily broken apart mechanically into the original discrete particles without undergoing excessive breakage.

This practice may be followed due to the rigid and tacky character of the dough shapes which permits them to be interlaced in spaced points of contact with one another whereby the tendency of the macaroni or other pasta pieces to flatten out when assembled into a bed is minimized. As a result, the interlaced plurality of filaments or cylinders of any shape (regardless of complexity and thickness) can be suitably layered onto one another, thereby making full use of any recirculating dehydrating medium employed to evaporate surface moisture from the cooked product. As indicated, this condition will be signified when the water-cooked dough shape has been dehydrtaed at its surface to a point where it is sticky in character. However, the average moisture content of the alimentary paste product will still be essentially unchanged but for a slight drop in the order of 1% to 2% moisture, due to surface evaporation. In general, therefore, the moisture content of the dough shape will be in the neighborhood of 65–80% moisture prior to deposition thereof in the form of a multi-layered bed. The extent of layering will, of course, be limited by the practical limits of the dehydration facility employed. In general, the surface dried dough shape may be layered to any height or thickness consistent with the dehydrating facility available.

The tackified pasta filaments or other shapes are assembled into a multi-layered condition and reduced to a stable moisture content by employing recirculating drying air having a dry bulb temperature preferably not exceeding 200° F. and, most preferably, in the neighborhood of 180–195° F. Lower recirculating air temperatures than those indicated as preferable may be employed with a consequent increase in the requisite drying period. In any event, however, the temperature of the recirculated drying air should exceed 130° F. No control of humidity in the drying air need be observed during drying. Accordingly, the incoming fresh air may have the normal relative humidity of atmospheric air and may be recycled in major proportion without any overt control being employed to adjust the moisture therein. When observing the foregoing preferred air temperature range, the period of dehydration will depend more or less upon the bed depth of the multi-layered dough pieces and the extent to which the drying air is recycled. In general, this period will be in the order of 1–2 hours for a bed having a thickness in the neighborhood of about 1.5″.

It is a necessary and important feature of the present invention that the dehydration be carried out under conditions which avoid rapid evaporation of moisture from the cooked dough piece in the pasta bed such as ensues when an elevated temperature well in excess of 200° F. is practiced for the entire dehydration cycle. Higher temperatures, i.e., in excess of 210° F., will cause the product to puff incident to the dehydration, the term puffing being understood to refer to the tendency of the pasta to blister or otherwise expand due to the force of the vaporizing water as it is evaporated. Although the initial part of the dehydration cycle may be carried out employing elevated temperatures in excess of 210° F., a point will be reached whereat puffing will ensue as a result of the continued circulation of air at an unduly elevated temperature. In general, therefore, the invention contemplates as an essential embodiment that the recirculation of hot air is practiced under conditions which avoid any significant degree of puffing of the product and this is assured when the recirculating air and the product contacted thereby is maintained throughout the dehydration process at a temperature below 200° F. Thus, in its broader sense, the process involves reducing the cooked pasta to a stable moisture level of less than 10% by removal of a majority of the moisture at a circulating air temperature of less than 210° F., preferably less than 200° F.

This practice assures that drying occurs at a rate whereby moisture is evaporated from the interior of the product at a rate substantially equal to that at which the moisture is removed from its exterior. This means that moisture is removed under conditions whereby the moisture evaporates from the vaporizing plane at a rate which does not exceed the rate at which water vapors can migrate to the surface of the product. By "vaporizing plane" is meant that plane or surface at which moisture is converted from the liquid to the vapor state. It is the point at which drying actually occurs. Initially the vaporizing plane or drying surface is at the surface of the pasta product (during the constant rate drying). Then the vaporizing plane will begin to recede to the interior of the pasta product (during the falling rate stage of drying). As the vaporizing plane recedes into the interior it becomes necessary for the water which is vaporized to migrate or diffuse to the outer surface of the product before escaping to atmosphere. If moisture is vaporized at a faster rate than it can diffuse to this surface, puffing or blistering of the product will occur. This is undesirable and should be avoided if the appearance, texture and rehydration properties of the precooked pasta are to be preserved during drying.

In an alternate method, the washed and quenched pasta pieces in lieu of surface drying may be conditioned to a form wherein the pieces will not adhere to adjacent pasta pieces by dehydrating the product to a moisture content ranging from 25–40%. This partial dehydration may be accomplished while the pasta pieces are in the form of a multi-layered bed. As a result of this partial dehydration, the pasta pieces per se are made flexible and mechanically handleable. The partially dried pasta bed may thus be broken and subsequently reformed into a multi-layered bed of any desired thickness depending upon the practicalities of operating equipment available and further dried to a stable moisture level. By reason of this bed reformation, the macaroni particles themselves are caused to separate one from the other such that at a final dehydrated form they are discrete and free-flowing relative to one another.

This handling and partial dehydration alternative permits the use of a double-apron type dryer wherein the initial dehydration to an intermediate moisture level, typically 30%, can be carried out while observing the circulating air temperatures called for herein and completing the dehydration operation by transferring the partially dried product to a second subjacent apron whereon the product is assembled for final dehydration.

The product of this invention when dried to a moisture content of less than 10%, will be dry to the touch, will have a density whereat individual pieces will not float to the top of any reconstituting liquid such as boiling water and will rehydrate to an edible pasta texture in substantially less time than a conventional product of the same shape and dimension. Hence, the product is quicker cooking than the commercially available raw macaroni products which require in the order of more than 10 minutes immersion in boiling water to cook to an edible consistency. The product produced will rehydrate to a cooked edible degree in an excess of boiling water in five minutes and will not turn soft or mushy. Advantageously, the product also has unique characteristics in that it may be combined in the dry state with other ingredients such as may be employed in the compounding of a casserole or other entree item with which the pasta would be jointly cooked. Thus, the pasta need not be separately cooked and then combined with the casserole ingredients but may be simply combined with such ingredients in a given amount of water such as may be required to fully rehydrate all of the casserole ingredients without requiring any pour-off or subsequent washing of the macaroni or such other pasta product.

It is a feature of the product of the present invention, therefore, that it has a number of uses in addition to those of products previously disclosed in the prior art which have mainly a quicker-cooking character but still are not amenable to the variations in recipes calling for different levels of moisture for cooking the product to an edible condition.

The invention will be more fully described by reference to the accompanying examples:

*Example I*

An alimentary pasta dough containing 30% water was prepared by mixing together 35 lbs. of ordinary commercial granular durum wheat with 15 lbs. of water in a conventional sigma blade mixer. The dough was transferred to a conventional pasta extruder, kneaded and then extruded into a macaroni form having an inner diameter of 0.038″ and an outer diameter of 0.100″. The extruded dough was cut into 1″ lengths by a revolving knife. The cut pieces were then placed on stainless steel trays and cooked in an excess of boiling water (20 lbs. of pasta: 200 lbs. of water) for 4 minutes. The cooked pasta dough was then drained and immediately quenched with sufficient cold tap water (45° F.) to cool the cooked pasta to below 100° F. and wash away free surface starch. The pasta pieces had a moisture content of 77% at this point.

The pasta pieces were then drained, spread out on stainless steel trays in mono-layer fashion and air dried under ambient room temperature conditions. After one hour of surface-drying, the pasta pieces were firm, tacky to the touch, had a moisture content of 75%, and were ready to be assembled into multi-layer beds for air drying at more elevated temperatures. Multi-layer beds having a height of 2″ were formed by interlacing the macaroni pieces one over the other. The beds were then placed on an endless drying belt which passed through a three-stage dryer. Each zone of the dryer was divided by insulating partitions through which the endless dryer belt travelled. Hot air was circulated through the belt as it passed each drying zone.

In the first drying zone the macaroni was contacted with air having a temperature of 180° F. The drying air was circulated upwardly through the macaroni bed at a superficial air velocity of 600 feet per minute. The macaroni was passed into the second drying zone where air having a temperature of 180° F. was passed downwardly through the macaroni. The product was then conveyed into the third drying zone where the product was finally dried to a terminal moisture content of less than 10% by an upward draft of circulating hot air, also at a temperature of 180° F.

By maintaining these temperature conditions throughout each drying stage water removal from the macaroni proceeded under conditions wherein the product had only gradual or slight shrinkage relative to the volume of the wet product introduced to the air dryer. Drying time in the three-stage dryer was about 50 minutes. During drying moisture was evaporated from the product under conditions which appeared to "set" the product so that with continued dehydration, the drying product did not undergo excess shrinkage. In its travel through the circulating air dryer, the product exhibited falling-rate drying conditions wherein the plane of vaporization was caused to move from the macaroni surface towards the interior portions of the macaroni, the liquid moisture at the interior portions diffusing therefrom to the planes of vaporization. The planes of vaporization at the outside surface of the macaroni moved to the interior portions more rapidly than the plane at the inside surface of the macaroni. The heat input to the product was controlled so that the rate of vapor generation at the planes of vaporization did not exceed the rate at which water vapor diffused to the external and internal surfaces of the macaroni pieces. Internal as well as external puffing, manifested by discrete blisters on the outside surface of the macaroni and larger blisters on the interior of the macaroni, is avoided. Thus, by drying in this manner, the rate of evaporation at the planes of vaporization of the macaroni product are substantially equal to the rate of vapor removal from the surfaces of the particle.

After drying, the dried beds were easily separated into discrete pasta pieces of macaroni by passage through a pair of tufted rubber crushing rolls. Breakage of the individual macaroni pieces was less than 10%. The pasta pieces were rehydrated by placing 6 oz. of the dried product in a saucepan to which was added 24 oz. of boiling water. The pan was covered and allowed to stand without additional heating. After 10 minutes, excess water was poured off. The reconstituted pasta had a texture and mouthfeel similar to a conventionally cooked pasta and was similar in all other respects to ordinary pasta goods.

Upon reconstitution, the dried pieces did not float in the reconstituting water, but were submerged therein indicating that they have an apparent density equal to, or greater than that of water.

*Example II*

The procedure of Example I was followed except for the rehydration step. About 6 ounces of the dried produce were placed in a saucepan with 32 ounces of cold water. The water was brought to a boil. After one minute the saucepan was removed from its heat source and the excess water was poured off. The reconstituted product had a texture and mouthfeel similar to conventionally cooked pasta and was similar in all other respects to ordinary pasta.

*Example III*

The procedure of Example I was followed except for the preliminary dehydration step. The cooked pasta pieces were arranged in interlaced multi-layer beds of about two inches height and dried for about one hour at room temperature to render the pieces firm and tacky. The procedure of Example I was then continued to obtain a final product which had a texture and mouthfeel similar to conventionally cooked pasta and was similar in all other respects to ordinary pasta.

*Example IV*

The procedure of Example I was followed up to and including the point of draining and quenching the cooked pasta product with tap water to cool at below 100° F. and wash it free of surface starch. As in Example I, the pasta pieces were drained but were then formed into a shallow multi-layered bed having a height of about ½" and introduced into a double-apron dryer having two drying zones and a separate drying belt in each zone. In the first section of the apron dryer, the pasta was reduced to a moisture content of approximately 30% in a period of about 30 minutes, air being circulated throughout the drying chamber at a temperature of 190° F. At this intermediate moisture content, the surface of the pasta was not tacky or sticky and the bonds between the individual macaroni pieces were sufficiently weak to allow the macaroni to be separated from one another and deposited on the second belt of the double-apron dryer by merely allowing the macaroni to drop from the terminal portion of the first belt onto the second belt. Drying in the second stage was carried out to a moisture content of less than 10%. In this operation the drying procedure was essentially the same as the drying process more particularly described in Example I, the product thus produced having substantially an unpuffed appearance and being only moderately shrunken from the apparent volume of the cooked pasta product entering the dryer while having an apparent density greater than that of water. The product was substantially free of "puffs" or blisters and any other imperfections. The throughput for a given unit of drying surface area was greater for this type of operation than in the case of the operation described in Example I. The product in all respects could be prepared in accordance with the recipe set forth in Examples I and II.

While this invention has been described by specific examples, reference should be made to the appended claims for a definition of its scope.

What is claimed is:

1. The process of making a pre-cooked dehydrated pasta product which comprises preparing an alimentary pasta-starch dough having a moisture content of 25–35%, kneading and forming said dough into pieces of desired shape, cooking the dough pieces in water to gelatinize the starch content thereof and increase the moisture content of said dough to about 65–80%, washing said cooked dough pieces to cool said dough pieces to a temperature below 100° F. and to remove excess surface starch, surface-drying said pieces in air to render the pieces tacky and rigid while reducing the total moisture content of said pieces about 1–2%, forming a multi-layered bed of said surface-dried pieces wherein said pieces are interlaced at spaced points of contact with one another, and drying said multi-layered bed to a stable moisture content of less than 10% for a period of from about 1 to about 2 hours at a temperature of 130° to 210° F. and said dried product being substantially unpuffed and having an apparent density at least equal to that of water.

2. The process of claim 1 wherein the pasta pieces are surface-dried in the form of a multi-layered bed, said bed being broken and then reformed prior to final drying.

3. The process of making a pre-cooked dehydrated pasta product which comprises preparing an alimentary pasta-starch dough having a moisture content of 25–35%, kneading and forming said dough into pieces of desired shape, cooking the dough pieces in water to gelatinize the starch thereof and increase the moisture content of said dough to about 65–80%, washing said cooked dough pieces to cool said dough pieces to a temperature below 100° F. and remove excess surface starch, forming a multi-layered bed of said cooked dough pieces wherein said pieces are interlaced at spaced points of contact with one another, partially drying said pieces in circulating air to an intermediate moisture level of about 25–40% to reduce adhesion between contacting dough pieces, disassembling said bed, reforming a multi-layered bed of said partially dried pieces, and drying said pieces to a stable moisture content of less than 10% by employing circulating air having a temperature of 130° to 210° F. for a period of from about 1 to about 2 hours, said dried product being substantially unpuffed and having an apparent density at least equal to that of water.

4. The process of making a pre-cooked dehydrated pasta product which comprises preparing an alimentary pasta-starch dough having a moisture content of 25-35%, kneading and forming said dough into pieces of desired shape, cooking the dough pieces in water to gelatinize the starch content thereof and increase the moisture content of said dough to about 65-80%, washing said cooked dough pieces to cool said dough pieces to a temperature below 100° F. and to remove excess surface starch, partially dehydrating the surfaces of the washed and cooled dough pieces thereby conditioning said pieces so as to permit their assembly into a multi-layered bed and to reduce the adhesion between particles as they are assembled in said multi-layered bed, assembling said partially dehydrated pieces into a multi-layered bed and drying said bed to a stable moisture content of less than 10% by employing circulating air having a temperature of 130° F. to 210° F. for a period of from about 1 to 2 hours, said dried product being substantially unpuffed and having an apparent density at least equal to that of water.

References Cited by the Examiner
UNITED STATES PATENTS

| | | | |
|---|---|---|---|
| 2,704,723 | 3/1955 | Poole | 99—85 |
| 2,813,796 | 11/1957 | Keneaster et al. | 99—80 |
| 3,138,462 | 6/1964 | Katz et al. | 99—85 |

A. LOUIS MONACELL, *Primary Examiner.*

RAYMOND N. JONES, *Examiner.*